US012681462B2

(12) United States Patent
Karaagac et al.

(10) Patent No.: US 12,681,462 B2
(45) Date of Patent: Jul. 14, 2026

(54) BROKER ENTITY TO BRIDGE SEMANTIC GAPS FOR INFORMATION PRODUCED IN INDUSTRIAL PLANTS

(71) Applicant: ABB Schweiz AG, Baden (CH)

(72) Inventors: Abdulkadir Karaagac, Ladenburg (DE); Johannes Schmitt, Ladenburg (DE); Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 343 days.

(21) Appl. No.: 18/532,243

(22) Filed: Dec. 7, 2023

(65) Prior Publication Data

US 2024/0111272 A1     Apr. 4, 2024

Related U.S. Application Data

(63) Continuation of application No. PCT/EP2022/063436, filed on May 18, 2022.

(30) Foreign Application Priority Data

Jun. 9, 2021     (EP) .................................... 21178440

(51) Int. Cl.
G05B 19/418          (2006.01)

(52) U.S. Cl.
CPC ..... G05B 19/4183 (2013.01); G05B 19/4185 (2013.01)

(58) Field of Classification Search
CPC .................................................. G05B 19/4183
See application file for complete search history.

(56) References Cited

U.S. PATENT DOCUMENTS

2009/0327150 A1     12/2009   Flake
2014/0222712 A1 *   8/2014   Samaha ................. G06Q 10/00
                                                                    705/342

(Continued)

FOREIGN PATENT DOCUMENTS

CN          111831700 A     10/2020
EP          3401800 A1     11/2018

(Continued)

OTHER PUBLICATIONS

European Patent Office, International Search Report in International Patent Application No. PCT/EP2022/063436, 3 pp. (Sep. 15, 2022).

(Continued)

*Primary Examiner* — Suresh Suryawanshi
(74) *Attorney, Agent, or Firm* — Fitch Even Tabin & Flannery LLP

(57)          ABSTRACT

A computer-implemented broker entity receives from a requesting device a request for one or more target values of state information that have sought target semantic meanings; obtains one or more source values of state information that are associated with given source semantic meanings; obtains at least in part from a transformation library one or more transformations, wherein each transformation maps one or more first values that are associated with first semantic meanings to one or more second values that are associated with second semantic meanings; applies the one or more transformations or a new transformation obtained based on the one or more transformations to the source values of state information, thereby obtaining the one or more target values of state information; and transmits the one or more target values to the requesting device.

6 Claims, 1 Drawing Sheet

(56)  References Cited

U.S. PATENT DOCUMENTS

| | | | |
|---|---|---|---|
| 2015/0241873 A1* | 8/2015 | Goldenberg | G05B 19/41865 |
| | | | 700/97 |
| 2020/0183035 A1* | 6/2020 | Liu | G06N 20/00 |
| 2020/0333770 A1 | 10/2020 | Schulz | |
| 2020/0380212 A1* | 12/2020 | Butler | G06F 16/211 |
| 2021/0096551 A1 | 4/2021 | Sayyarrodsari et al. | |
| 2021/0263900 A1* | 8/2021 | Joyce | G06N 20/00 |
| 2024/0056502 A1* | 2/2024 | Wagener | G05B 19/0423 |

FOREIGN PATENT DOCUMENTS

| | | |
|---|---|---|
| EP | 3709227 A1 | 9/2020 |
| WO | WO 2020/182893 A1 | 9/2020 |

OTHER PUBLICATIONS

European Patent Office, Written Opinion in International Patent Application No. PCT/EP2022/063436, 8 pp. (Sep. 15, 2022).

European Patent Office, Extended European Search Report in European Patent Application No. 21178440.0, 9 pp. (Dec. 10, 2021).

Search Report issues in corresponding Chinese Application No. 202280041089.9; dated Mar. 28, 2026; In Chinese with English machine translation (18 pages).

* cited by examiner

BROKER ENTITY TO BRIDGE SEMANTIC GAPS FOR INFORMATION PRODUCED IN INDUSTRIAL PLANTS

CROSS-REFERENCE TO RELATED APPLICATIONS

The instant application claims priority to International Patent Application No. PCT/EP2022/063436, filed May 18, 2022, and to European Patent Application No. 21178440.0, filed Jun. 9, 2021, each of which is incorporated herein in its entirety by reference.

FIELD OF THE DISCLOSURE

The present disclosure relates to the processing of information that is produced in industrial plants, in particular by sensor devices, actuator devices and other control equipment that is in a direct relationship with a process executed on the plant.

BACKGROUND OF THE INVENTION

The monitoring and active controlling of an industrial plant is based on various information gathered within the plant. For example, sensor devices output measurement values, and actuator devices report their operational status.

Each piece of information has some semantic meaning. For example, each measurement value carries a measurement unit. Also, for each piece of information, the device from which it is sent gives away a notion of the location within the plant from which the information emanates.

Consumers of information, such as components of a distributed control system or a SCADA system, may need to obtain the information in the context of an information model that is different from the information model in which the information was originally acquired. Previously, it was the job of each individual consumer to obtain the information according to the original information model in which it was acquired and translate it to the information model in which it was actually needed.

WO 2020/182 893 A1 discloses a system and method to improve interoperability in the communication between producers and consumers of information. A digital representation of a physical device stores a plurality of data models, and each data model corresponds to one of the information systems that are to communicate.

BRIEF SUMMARY OF THE INVENTION

Embodiments in accordance with the present disclosure facilitate the exchange of information between producers and consumers of information in a situation where the data acquisition, e.g., the measurement, happens in the context of a first information model, but the evaluation for the monitoring and/or control of a technical system needs to happen in the context of a second information model.

The present disclosure describes a computer-implemented broker entity for conveying state information from a technical system as a producer to a requesting device as a consumer. This state information comprises a plurality of values that have been measured and/or generated by components of the technical system. Each such value is associated with a given semantic meaning.

For example, when a measurement instrument outputs a measurement value, this value is associated with a measurement unit of a physical quantity that a value represents. E.g., a temperature may be measured in degrees Fahrenheit, degrees Celsius or in Kelvin, and a pressure may be measured in bar or in pounds per square inch, psi. Also, the source device from which the measurement value gives away a location that is associated with this measurement value, such as "thermometer number X" or "pressure gauge number Y". In semantic segmentation of images, each pixel of the image is assigned classification scores with respect to particular classes (e.g., "tree", "bushes", "vehicle" or "road") of a given classification. Other applications may define their own semantic meanings of values. For example, the Self-Monitoring, Analysis and Reporting Technology, S.M.A.R.T., for computer hard drives measures a variety of parameters that are indicative of the physical health status of the hard drive.

BRIEF DESCRIPTION OF THE SEVERAL VIEWS OF THE DRAWING(S)

DETAILED DESCRIPTION OF THE INVENTION

Figure 1:
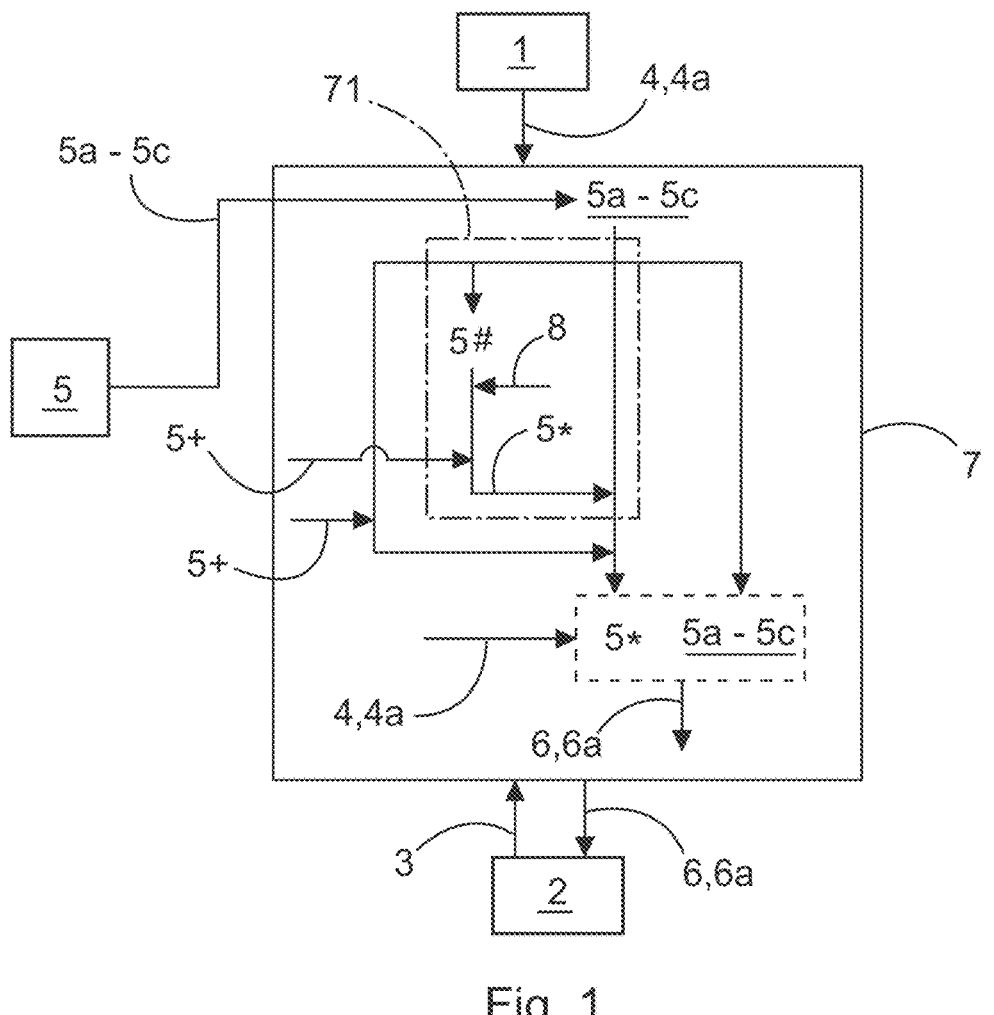
FIG. 1 is a block diagram of a broker entity in cooperation with a technical system in accordance with the disclosure.
Figure 2:
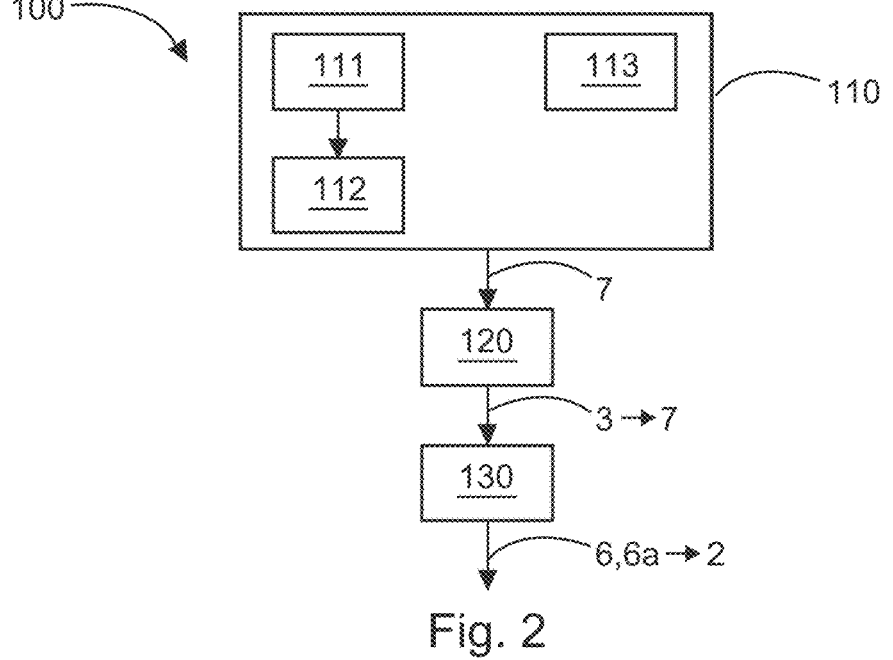
FIG. 2 is a flow diagram for a method of conveying information in accordance with the disclosure.

An exemplary embodiment of a broker entity 7 in cooperation with a technical system 1 and a requesting device 2 is shown in FIG. 1. FIG. 2 shows a flow diagram of an exemplary embodiment of a method 100 for conveying state information.

FIG. 1 is a schematic diagram of the interaction between a broker entity 7, a technical system 1 and a requesting device 2. The requesting device 2 transmits a request 3 for one or more target values 6 of state information that have sought target semantic meanings 6a to the broker entity 7. The broker entity 7 obtains one or more source values 4 of state information that are associated with given source semantic meanings 4a from the technical system 1. This may, for example, happen upon request (such as polling) sent by the broker entity 7. But the broker entity 7 may also, for example, be permanently subscribed to topics that are published by the technical system 1 and comprise source values 4 with the given source semantic meanings 4a.

The broker entity 7 obtains transformations 5a-5c from a transformation library 5. Each such transformation maps one or more first values that are associated with first semantic meanings to one or more second values that are associated with second semantic meanings.

The transformations 5a-5c may be used directly. Alternatively, or in combination, a new transformation 5* obtained based on the one or more transformations 5a-5c may be used. Whichever transformations 5a-5c, 5* are used, they are applied to the source values 4 with the given source semantic meanings 4a, to yield the target values 6 of the sought target semantic meanings 6a.

One exemplary way of obtaining a new transform 5* is to generate one or more candidate transformations 5 #. Based on a distance 8 between the respective achieved intermediate semantic meanings and the target semantic meanings 6a, these candidate transformations 5 #may be optimized to yield a final new transformation 5*. In the example shown in FIG. 1, the generating and optimizing of candidate transformations 5 # is performed in a transformation engine 71 that is a sub-entity of the broker entity 7. As discussed before, the transformation engine 71 may be run on a compute entity that is distinct from the one used to run the rest of the broker entity 7. For example, while the rest of the broker entity 7 may run continuously on a compute instance with modest resources, the transformation engine 71 may be run on a higher-powered compute instance that is spun up temporarily whenever the creation and optimization of candidate transformations 5 # is needed.

Alternatively, or in combination, an engineer may augment the transformations 5a-5c, and/or the candidate transformations 5 #, with a further transformation 5+ that fills a gap between the currently achievable intermediate semantic meanings and the sought target semantic meanings 6a.

FIG. 2 is a schematic flow chart of an embodiment of the method 100 for conveying state information from an industrial plant as a technical system 1 to a requesting device 2 as a consumer.

In step 110, the broker entity 7 discussed in FIG. 1 is provided. In step 120, at least one request 3 for one or more target values 6 of state information that have sought target semantic meanings 6a from the requesting device to the broker entity 7. In step 130, the target values 6 with the sought target semantic meanings 6a that have been obtained from the broker entity 7 are forwarded to the requesting device 2.

According to block 111, the broker entity may be placed within an internal network of the industrial plant, and/or on an edge device of this internal network. According to block 112, connectivity between the broker entity 7 and a transformation library 5 that resides outside this internal network may be provided.

According to block 113, access to a transformation library 5 that is common to multiple industrial plants may be provided, so as to maximize the re-using of knowledge across plant boundaries.

Each parameter is mapped to a scale that ranges from 0 to 255. When a parameter passes a predefined threshold, a warning is issued.

But a requesting device that is to monitor and/or control the technical system may need the values in the context of a different semantic meaning. For example, a process controller may need to know the pressure in a certain vessel in which substance S is manufactured, in bar. It is the job of the broker entity to answer such requests and obviate the need for the requesting device to have much more detailed knowledge about the internal workings of the technical system, such as an industrial plant.

To this end, the broker entity is configured to receive, from the requesting device, a request for one or more target values of state information that have sought target semantic meanings. In the mentioned example, the location "vessel in which substance S is manufactured" and the measurement unit "bar" for the pressure are both sought target semantic meanings.

The broker entity is further configured to obtain, from the technical system, one or more source values of state information that are associated with given source semantic meanings. In the example mentioned above, the source values may comprise pressure measurement values from many different sensors in the plant, part of which report the pressure in bar and part of which report the pressure in psi.

The broker entity is configured to obtain, at least in part from a transformation library, one or more transformations. Each such transformation maps one or more first values that are associated with first semantic meanings to one or more second values that are associated with second semantic meanings.

For example, the transformation library may comprise transformations that convert a measurement value from one measurement unit (such as psi for pressure) to another (such as bar). But the transformation may, for example, also transform locations. For example, the transformation may map an identifier of a device that has measured a measurement value to a location within the plant, based on a known layout of the plant. The location may, for example, be in the form of coordinates, and/or in the form of a functional unit of the plant. Thus, when the broker entity is asked for measurement values from a particular section of the plant, it may respond with just the values that come from this section, without the requesting device having to know details of how sensor devices are assigned to plant sections.

The transformation library may also comprise transformations that convert classification scores that relate to a source class hierarchy to classification scores that relate to a target class hierarchy. For example, a semantic segmentation of an image may comprise trees, bushes, cars, bikes, and a roadway. But the target semantic meaning may just distinguish between plants, vehicles, and roadway. The transformation may thus combine the pixels labelled "tree" and pixels labelled "bush" to pixels labelled "plants" in the target image. Likewise, the pixels labelled "car" and the pixels labelled "bike" may be combined to pixels labelled "vehicle" in the target image.

The broker entity is configured to apply one or more transformations, or a new transformation obtained based on the one or more transformations, to the source values of state information. In this manner, the one or more target values of state information are obtained. In the example mentioned above, the broker entity may deliver pressure measurement values from all sensors that sense the pressure in the vessel where substance S is manufactured, and wherever a sensor device outputs the pressure in psi, this is automatically converted to bar.

The broker entity is further configured to transmit the one or more target values to the requesting device. That is, the whole transformation from source values of the source semantic meaning to the target values of the sought target meaning is now demand-driven, triggered by the needs of the requesting device. The broker entity may ensure a continuous flow of data from the technical system to the requesting device.

The broker entity thus introduces a layer of abstraction. The requesting device no longer needs to do any conversions; rather, it just requests the information according to the information model in which it is needed for further processing. Conversions and transformations are all managed by the broker entity. In particular, in a situation where many different requesting devices need state information, transformations from the transformation library may be re-used. For example, if multiple requesting devices require conversion of a measurement value between measurement units, one and the same transformation may be used over and over again. There is no need for each requesting device to have program code to perform this transformation. This eliminates sources of error and reduces the burden for testing. The code for the transformation needs to be written and tested only once.

Also, combinations of transformations that are already in the transformation library may just use these already tried-and-tested individual transformations, without a need for testing every possible combination again.

Moreover, the abstraction layer minimizes the required effort in case the requesting device, and/or a device that produces measurement values, changes. For example, a field device may break after a long time of use, and it may turn out to be impossible to replace it by exactly the same type of device because this type was already discontinued long ago. The device will then have to be replaced by a newer device that may behave differently in some respects.

Another exemplary use case comprises accessory devices for cars that tap into the on-board diagnosis, OBD, or CAN bus of the car for measurement values. For example, some insurance companies are granting a discount on the regular premium in exchange for a consent to monitoring the driver behavior with a measuring device. The monitored behavior is evaluated for signs of carelessness or readiness to take risks on the side of the driver. Cautious behavior is rewarded by plus points and a lower premium, reckless behavior is penalized by minus points and a higher premium. Initial measuring devices of this kind were quite simple and registered, e.g., acceleration forces in multiple axes, the times of day the vehicle was used, and the length of trips. But in order to arrive at a more accurate assessment, it is desirable to obtain information, such as a steering angle or pedal positions, directly from vehicle systems. While the exchange of information within the car, and in particular the output of the OBD port, is standardized at least to some degree, some information is exchanged in proprietary formats. If the measuring device is to be ported from one type of vehicle to the next, and it utilizes the broker entity, the broker entity performs all the magic of the switch to a new type of vehicle. No program code of the measuring device itself needs to be adapted and tested again.

The broker entity may be embodied in software, hardware, firmware or any suitable combination thereof. Furthermore, the broker entity may also be provided "as a service" in a cloud. For example, a cloud microservice with a very large transformation library may offer to convert any source semantic meaning to any target semantic meaning at a pay-per-use price, akin to "AWS Elemental MediaConvert" marketed by Amazon for transcoding video content.

Transformations in the transformation library are not limited to taking one value as input and returning one value as output. For example, at least one transformation may compute, from two or more first measurement values of different physical quantities, at least one second value of an aggregate of these physical quantities. For example, a voltage drops over an electrical line and a current flowing through that line may be aggregated to the electrical resistance of this line according to Ohm's law.

The broker entity may form new transformations out of already existing transformations in any suitable manner. The new transformations may then be stored in the transformation library as well for future use. Thus, the transformation library may "learn" during continued use.

The main advantage of the broker entity is that it allows the automatic demand-driven setup and preservation of communication paths between information consumers and providers in Industrial Systems. This includes not only semantic and structural transformation of information, but also automated and adaptive deployment and execution of many/complex information acquisition paths during runtime within a large system. This means the proposed solution considers the cases where underlying information sources/consumers/transformations may change over time, and it keeps track of changes on the information sources/consumers (demands) and automatically adapts/resolve transformations so that the corresponding data flow continues without any interruption.

Without a functionality which enables continuous transformation resolution during system run time which address the dynamicity (change in source, consumer, existing set of transformations) in any of the Information Consumer or the Information Source. That is, a change in the source, in the consumer, and/or in the available transformations, may permanently break connections between sources and consumers.

Additionally, the proposed solution describes one shared/growing transformation library across multiple plants that then all benefit from the continued learning.

Without such growing transformation knowledge in the form of a library, in a large plant, or even across plants, one and the same knowledge has to be generated time and time again.

Another novel functionality in the proposed solution is partial resolution which means that the transformation engine could only identify information resources matching with some proportion: success rate. In that case, either data flow is initiated with partial data or the engineers are asked to fill the gap with minimal effort. In particular, by means of a distance metric between semantic meanings, the proposed broker entity may transform the data as close to the target semantic meaning as possible and then ask an engineer only for the small missing link.

Without such a transformation engine, if the mapping does not succeed fully, no matter how small the missing link is, then the flow of information cannot go ahead.

The functionality of forming new transformations out of already existing transformations may preferably be realized in a transformation engine that is a distinct sub-entity of the broker entity. This facilitates the outsourcing of said functionality to a different compute entity, such as a higher-powered compute instance in a cloud. For example, if a richly filled transformation library is already available, it may become necessary only occasionally to form new transformations. A container or other virtualized compute instance with the transformation engine may then be temporarily spun up with a higher amount of allocated compute resources, so that the needed new transformation may be obtained more quickly without hogging the high amount of compute resources all the time.

In one example, transformations may be combined by applying a first transformation to one subset of the first values and applying a second transformation to another subset of the first values. For example, both temperature measurement values and pressure measurement values may be converted into their respective SI units Kelvin and Pascal. The combined transformation converts a complete record of measurement values, which comprises temperature values and pressure values, into SI units.

In another example, a first transformation may be applied to one or more values, and a second transformation may be applied to the result of the first transformation. That is, two transformations may be chained to form a new transformation. For example, a pressure may first be converted from psi to bar, and then the atmospheric pressure may be subtracted, thereby arriving at a pressure in bar above atmospheric pressure. Of course, this example is non-limiting with respect to the number of transformations. Any number of transformations may be chained in the same manner. For example, a path finding algorithm or approach may be used to find a chain of transformations that can resolve a path between a source semantic meaning and a target semantic meaning.

In another example, an inverse of a transformation may become a new transformation. Many transformations may be automatically inverted, so that given one transformation, the inverse transformation may be used without writing additional code.

In a further advantageous embodiment, the broker entity is further configured to generate, from one or more transformations obtained from the transformation library, one or more candidate transformations. A distance between an intermediate semantic meaning to which this candidate transformation can map the source semantic meanings on the one hand and the sought target semantic meanings on the other hand may then be determined according to any appropriate metric. If the candidate transformation delivers exactly the sought target semantic meanings, this corresponds to a distance of zero. A candidate transformation for which the distance is optimal may be stored in the transformation library as an optimal new transformation.

This opens up a possibility for further learning of the transformation library. In particular, the broker entity may be further configured to demand, from an engineer, input of a further transformation from the intermediate semantic meaning outputted by the optimal new transformation to the sought target semantic meaning. In this manner, the broker entity may work out the overall transformation from the source semantic meaning to the sought target semantic meaning as far as possible in an automated manner, asking the engineer only for the test that cannot be worked out automatically. For example, the broker entity may be lacking knowledge as to which section of the plant a particular sensor belongs, or how to map a pressure value to a desired target scale for further processing. The engineer may be asked to provide just this "missing link", which may then go into the transformation library and may then be re-used whenever needed again. If the engineer is asked for more than the "missing link", he is asked for more manual work than is actually needed in the situation at hand. Furthermore, the solution obtained from the engineer becomes more complex, and it becomes more unlikely that re-using this solution in other situations will be possible.

That is, even if the automated lookup and/or creation of a transformation only goes part of the way from the source semantic meaning to the sought target semantic meaning, much time is already saved compared with the previous situation where an engineer had to work out the whole transformation from the source semantic meaning to the sought target semantic meaning.

If a candidate transformation is a full solution to go from the source semantic meanings to the target semantic meanings, then this may be further verified and validated. For example, Schemas, such as JSON, may be used for such verification and validation. For example, missing optional or mandatory fields may be identified, and data types (such as int, string or Boolean) of the resulting field may be validated.

Depending on the size of the available transformation library, candidate transformations may, for example, be generated based on a brute-force approach that tries all possible combinations, or based on a Monte-Carlo approach that samples such combinations. But more intelligent approaches may be used as well.

For example, inheritance hierarchies akin to those in object-oriented programming may be exploited. For example, if a transformation is needed in the context of a particular car model as a technical system, it may be useful to start from a more generic transformation in the context of all cars from this manufacturer, or from an even more generic transformation that is valid for all cars and optimize this as described above. Thus, in a further advantageous embodiment, the broker entity is further configured to obtain the new transformation, and/or the candidate transformation, based at least in part on a match between the technical system on the one hand, and other technical systems to which transformations that form an inheritance hierarchy within in the transformation library relate on the other hand.

Automated resolution of transformation needs by using existing transformations is one of the fundamental capabilities of proposed solution. It is a major point that the broker entity uses not only a transformation library of already available transformations, but also a Transformation Engine that can produce new transformations out of already existing transformations, e.g., with the exemplary resolution approaches described above.

Without the possibility to create new transformations from existing ones, manual intervention is needed to augment the existing set of transformations.

Commonalities along model standards in the same domain may be exploited in a similar manner. For example, a transformation addressing a generic type in another standard may be applied to a similar type in a given standard.

The invention also provides a method for conveying state information from an industrial plant as a technical system to a requesting device as a consumer.

In the course of this method, the broker entity described above is provided in whatever form. At least one request for one or more target values of state information that have sought target semantic meanings from the requesting device to the broker entity. The target values obtained from the broker entity are forwarded to the requesting device. As described above, the newly introduced layer of abstraction will uncouple the processing of state information by the requesting device from many intricate details of the industrial plant.

In particular, the components of the industrial plant that measure and/or generate values may be chosen to comprise at least one of: sensor devices that measure physical quantities in an industrial process executed on the plant; and actor devices that act upon the execution of the industrial process and report a state of operation.

Examples of sensor devices are voltmeters, ammeters, thermometers, pressure gauges, strain gauges and other sensors that capture a value of a physical measurement quantity. Examples of actor devices are valves, heaters, stirrers, and any other devices that modify the behavior of an industrial process.

In an advantageous embodiment, the broker entity is placed within an internal network of the industrial plant, and/or on an edge device of this internal network. Connectivity between the broker entity and a transformation library that resides outside this internal network is provided. In this manner, an externally provided broker entity with a potentially very large and comprehensive transformation library may be used. But at the same time, the broker entity is ensured to be in constant contact with the requesting device and the plant devices that generate the source values. In case the connection from the broker entity to the transformation library breaks down, the broker entity will then still be able to use the transformations that it has already pulled from the transformation library. Thus, it will still be able to handle all situations that it has handled before during plant operation. Only the capability to react to new situations that require pulling more transformations from the transformation library will then be lost until the connection is restored.

In a further advantageous embodiment, the providing of the broker entity comprises providing access to a transformation library that is common to multiple industrial plants. In this manner, the transformation library may combine knowledge that has been "learned" on the multiple plants, including transformations that have been requested from an engineer to fill in gaps as described above. This knowledge may be re-used wherever appropriate as described above.

The transformation library is of value on its own because a larger and more complete transformation library directly increases the capability of the broker entity to transform from source semantic meanings to target semantic meanings. Thus, the transformation library may, for example, be sold separately, or set up as a cloud microservice with a pay-per-use pricing model.

Therefore, the invention also provides a transformation library with multiple transformations. Each of these multiple transformations maps one or more first values that are associated with first semantic meanings in the context of at least one industrial plant to one or more second values that are associated with second semantic meanings in the context of the plant. The first semantic meaning, and/or the second semantic meaning, comprise one or more of: a measurement unit of a physical quantity measured in the plant that a value represents; a location in the plant where a value has been determined; and one or more classes with respect to which a value is a classification score.

In an advantageous embodiment, at least a first transformation relates to a first semantic meaning and a second semantic meaning that are relevant within the context of a first industrial plant. At least a second transformation relates to a different first semantic meaning and a different second semantic meaning that are relevant within the context of a different second industrial plant, but not within the context of the first industrial plant. In this manner, distinct knowledge from the multiple plants is "pooled" in the transformation library.

As discussed before, the broker entity, and/or the method, may be at least partially implemented in software. The invention therefore also provides a computer program with machine-readable instructions that, when executed by one or more computers, and/or one or more virtualized execution environments, upgrade the one or more computers, and/or the one or more virtualized execution environments, to the broker entity as described above, and/or cause the one or more computers, and/or the one or more virtualized execution environments, to perform the method as described above.

The invention also provides a non-transitory storage medium, and/or a download product, with this computer program, and/or with the transformation library described above. A download product is a product that may be sold in an online shop for immediate fulfillment by download.

The invention also provides one or more computers and/or virtualized execution environments with the transformation library as described above, with the computer program, and/or with the non-transitory storage medium and/or download product.

LIST OF REFERENCE SIGNS 1 technical system
2 requesting device
3 request for values 6 of semantic meaning 6a
4 source values of state information of technical system 1
4a semantic meanings of source values 4
5 transformation library
5a-5c transformations obtained from transformation library 5
5* new transformation, obtained based on transformations 5a-5c

10

5 #candidate transformation
5+ further transformation requested from engineer
6 target values
6a sought target semantic meanings of target values 6
7 broker entity
71 transformation engine of broker entity 7
8 distance to sought target semantic meanings 6a
100 method for conveying state information
110 providing broker entity 7
111 placing broker entity 7 on internal network
112 providing connectivity to transformation library 5 outside internal network
113 providing access to transformation library 5 for multiple plants
120 forwarding request 3 to broker entity 7
130 forwarding target values 6 from broker entity 7 to requesting device 2

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented broker entity for conveying state information from a technical system as a producer to a requesting device as a consumer, wherein the state information comprises a plurality of values that have been measured and/or generated by components of the technical system, each value is associated with a given semantic meaning, and the broker entity is configured to:

receive from the requesting device a request for one or more target values of state information that have sought target semantic meanings;

obtain from the technical system one or more source values of state information that are associated with given source semantic meanings;

obtain at least in part from a transformation library one or more transformations, wherein each transformation maps one or more first values that are associated with first semantic meanings to one or more second values that are associated with second semantic meanings;

apply the one or more transformations, or a new transformation obtained based on the one or more transformations, to the source values of state information, thereby obtaining the one or more target values of state information;

transmit the one or more target values to the requesting device;

wherein a new transformation obtained based on the one more transformation comprises one or more of:

applying a first transformation to one subset of the first values, and applying a second transformation to another subset of the first values;

applying a first transformation to one or more values, and applying a second transformation to the result of the first transformation; and applying an inverse of a transformation.

2. The broker entity of claim 1, wherein the source semantic meanings, and/or the target semantic meanings, comprise one or more of:

a measurement unit of a physical quantity that a value represents;

a location in the technical system where a value has been determined; and one or more classes with respect to which a value is a classification score.

3. The broker entity of claim 2, further configured to obtain at least one transformation that computes, from two or more first measurement values of different physical quantities, at least one second value of an aggregate of these physical quantities.

4. The broker entity of claim 1, wherein the broker entity is further configured to obtain the new transformation and/or the candidate transformation based at least in part on a match between the technical system and other technical systems to which transformations that form an inheritance hierarchy within in the transformation library relate.

5. A computer-implemented broker entity for conveying state information from a technical system as a producer to a requesting device as a consumer, wherein the state information comprises a plurality of values that have been measured and/or generated by components of the technical system, each value is associated with a given semantic meaning, and the broker entity is configured to:

receive from the requesting device a request for one or more target values of state information that have sought target semantic meanings;

obtain from the technical system one or more source values of state information that are associated with given source semantic meanings;

obtain at least in part from a transformation library one or more transformations, wherein each transformation maps one or more first values that are associated with first semantic meanings to one or more second values that are associated with second semantic meanings;

apply the one or more transformations, or a new transformation obtained based on the one or more transformations, to the source values of state information, thereby obtaining the one or more target values of state information;

transmit the one or more target values to the requesting device;

wherein the broker entity is further configured to:

generate from one or more transformations obtained from the transformation library one or more candidate transformations;

determine a distance between an intermediate semantic meaning to which this candidate transformation can map the source semantic meanings on the one hand and the sought target semantic meanings on the other hand; and storing a candidate transformation for which this distance is optimal in the transformation library as an optimal new transformation.

6. The broker entity of claim 5, wherein the broker entity is further configured to:

demand, from an engineer, input of a further transformation from the intermediate semantic meaning outputted by the optimal new transformation to the sought target semantic meaning; and store this further transformation in the transformation library.

* * * * *